United States Patent
Kobayashi et al.

(10) Patent No.: US 10,090,760 B2
(45) Date of Patent: Oct. 2, 2018

(54) DC-DC VOLTAGE CONVERSION DEVICE

(71) Applicant: Mitsubishi Electric Corporation, Tokyo (JP)

(72) Inventors: Masaru Kobayashi, Tokyo (JP); Matahiko Ikeda, Tokyo (JP); Nobuhiro Kihara, Tokyo (JP); Kazuhiko Otsuka, Tokyo (JP); Junichi Abe, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 72 days.

(21) Appl. No.: 15/431,913

(22) Filed: Feb. 14, 2017

(65) Prior Publication Data

US 2017/0294838 A1   Oct. 12, 2017

(30) Foreign Application Priority Data

Apr. 12, 2016   (JP) .................. 2016-079278

(51) Int. Cl.
| | |
|---|---|
| *H02M 3/00* | (2006.01) |
| *H02M 3/158* | (2006.01) |
| *H02J 7/00* | (2006.01) |
| *H02M 1/32* | (2007.01) |
| *H02M 1/00* | (2006.01) |

(52) U.S. Cl.
CPC .......... *H02M 3/158* (2013.01); *H02J 7/0072* (2013.01); *H02M 1/32* (2013.01); *H02M 2001/0048* (2013.01); *H02M 2001/327* (2013.01)

(58) Field of Classification Search
None
See application file for complete search history.

(56) References Cited

U.S. PATENT DOCUMENTS

2010/0327837 A1* 12/2010 Tsugawa ............... H02M 1/32
                                                              323/285

FOREIGN PATENT DOCUMENTS

| JP | 07-135731 A | 5/1995 |
|---|---|---|
| JP | 3075303 B2 | 8/2000 |

* cited by examiner

*Primary Examiner* — Leigh Garbowski
(74) *Attorney, Agent, or Firm* — Sughrue Mion, PLLC; Richard C. Turner

(57) ABSTRACT

In a DC-DC voltage conversion device, overheat of a diode element connected in anti-parallel with a semiconductor switching element is a problem, and in order to resolve this, a temperature of a semiconductor switching element of a main conversion circuit is detected, a temperature of a diode element connected in parallel with the semiconductor switching element is calculated using a correction calculation of the detected semiconductor switching element temperature value in accordance with a step-up ratio of the DC-DC voltage conversion device, and diode element overheat protection is carried out in accordance with the calculated temperature value.

7 Claims, 12 Drawing Sheets

DC-DC VOLTAGE CONVERSION DEVICE

BACKGROUND OF THE INVENTION

Field of the Invention

The present invention relates to a DC-DC voltage conversion device that converts a direct current voltage into another direct current voltage, and in particular, relates to a DC-DC voltage conversion device that includes a system that protects against overheat of a power semiconductor unit.

Description of the Related Art

A DC-DC voltage conversion device is such that a power semiconductor element, such as an insulated gate bipolar transistor (IGBT) or metal-oxide-semiconductor field-effect transistor (MOSFET), is used as a semiconductor switching element, and a direct current voltage is converted into another direct current voltage by a switching operation of the power semiconductor element being repeated. When the switching operation is performed, heat generation occurs due to power loss in a semiconductor junction portion (hereafter, junction portion) inside the semiconductor element, and the heat is transferred from the junction of the power semiconductor element to a case or heat sink of the semiconductor element, and dissipated.

Meanwhile, the junction of the power semiconductor element has an allowable temperature, and when the allowable temperature is exceeded, the performance of the power semiconductor element deteriorates, which causes destruction in some cases.

A DC-DC voltage conversion device that includes an overheat protection function, whereby junction temperature is measured and the power semiconductor element is caused to carry out a protective operation when there is an overheat, has been developed in order to prevent deterioration or destruction of the previously described kind of power semiconductor element due to a temperature rise.

In order for this kind of overheat protection function to operate effectively, accurate junction temperature measurement is necessary. However, direct measurement of junction temperature in an actual product is difficult. Therefore, a method whereby temperature in a predetermined position in a power semiconductor module is measured using a temperature sensor, a difference between the temperatures of the predetermined portion and the junction portion is calculated from an amount of heat generated (power loss) inside the power semiconductor element, and the junction temperature is estimated, has been proposed as in Patent Document 1 and Patent Document 2.

[Patent Document 1] Japanese Patent No. 3,075,303
[Patent Document 2] JP-A-7-135731

However, although attention has been given to heat generation in a power semiconductor element such as an IGBT or MOSFET, and temperature estimated accurately as a countermeasure against the heat generation, as described in Patent Document 1 and Patent Document 2, not a great deal of attention has been given to the temperature of a diode element connected in parallel with a power semiconductor element such as an IGBT or MOSFET.

With regard to a diode element too, there is a problem in that heat generation occurs due to power loss, and the junction temperature rises. In particular, there is a problem in that, depending on a usage condition (a switching mode when charging and discharging), the temperature of the diode element may become greater than that of the power semiconductor element of the DC-DC voltage conversion device.

SUMMARY OF THE INVENTION

The invention, having been contrived in order to resolve the heretofore described kind of problem, has an object of providing a DC-DC voltage conversion device that converts a direct current voltage into a stepped-up direct current voltage, wherein the temperature of a main circuit diode element is calculated by a correction calculation being carried out using a detected temperature of a power semiconductor element having correlation as a main circuit configuration of the DC-DC voltage conversion device and a step-up ratio, thus protecting from overheat destruction in accordance with the calculated value with a simple configuration, at low cost, and easily.

In order to achieve the heretofore described object, the invention includes a semiconductor switching element of a main conversion circuit of a DC-DC voltage conversion device, a diode element connected in parallel with the semiconductor switching element, a temperature detection unit that detects a temperature of the semiconductor switching element, a diode element temperature calculation unit that calculates a temperature of the diode element using a correction calculation that utilizes the semiconductor switching element temperature detected by the temperature detection unit and a step-up ratio of the DC-DC voltage conversion device, and overheat protection means that carries out control for protecting the diode element in accordance with the calculated value.

The DC-DC voltage conversion device of the invention is such that a diode element temperature is estimated by carrying out a correction calculation using a detected temperature of a semiconductor switching element and a step-up ratio, whereby the diode element can be protected from overheat destruction.

The foregoing and other objects, features, aspects and advantages of the invention will become more apparent from the following detailed description of the invention when taken in conjunction with the accompanying drawings.

DETAILED DESCRIPTION OF THE PREFERRED EMBODIMENTS

First Embodiment

Hereafter, based on the drawings, a description will be given of a DC-DC voltage conversion device according to a first embodiment of the invention.

Figure 1:
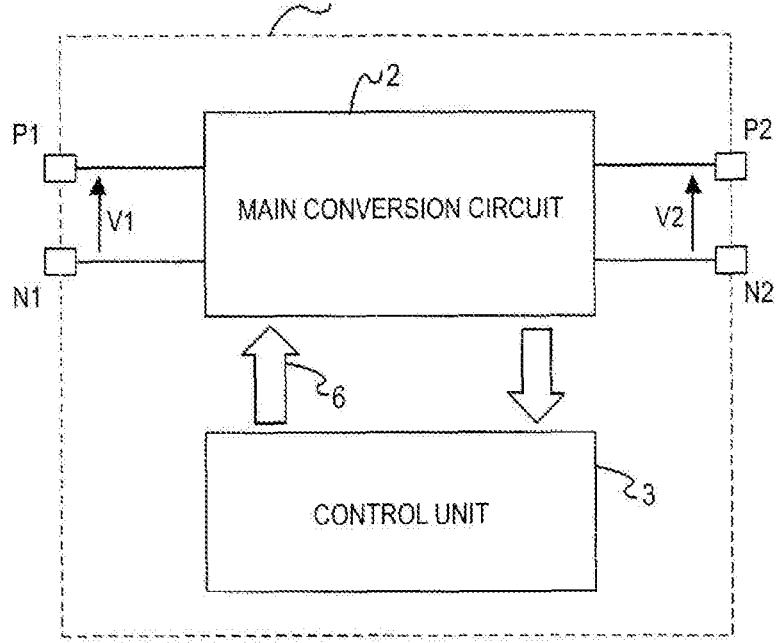
FIG. 1 is a block diagram showing an overall configuration of a DC-DC voltage conversion device in a first embodiment of the invention.

FIG. 1 is a block diagram showing an overall configuration of the DC-DC voltage conversion device according to the first embodiment of the invention. The DC-DC voltage conversion device 1 is configured of a main conversion circuit 2 and control unit 3. The DC-DC voltage conversion device 1 includes a positive electrode side terminal P1 and negative electrode side terminal N1 on a primary side of the main conversion circuit 2 as power path connection terminals, and includes a positive electrode side terminal P2 and negative electrode side terminal N2 on a secondary side (these may be abbreviated to simply "terminals" hereafter).

Figure 2:
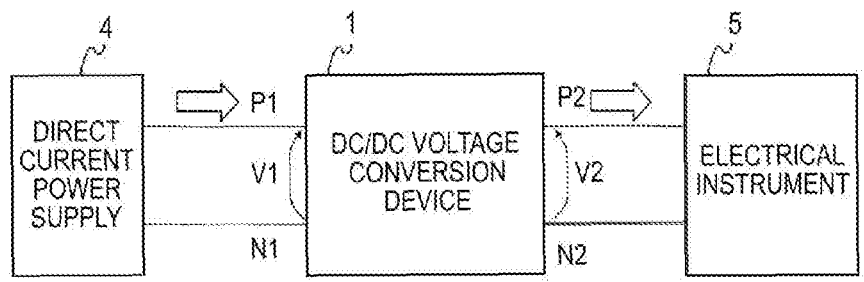
FIG. 2 is a block diagram schematically showing a voltage exchange and power flow between a primary side and secondary side of the DC-DC voltage conversion device in the first embodiment of the invention.
Figure 3:
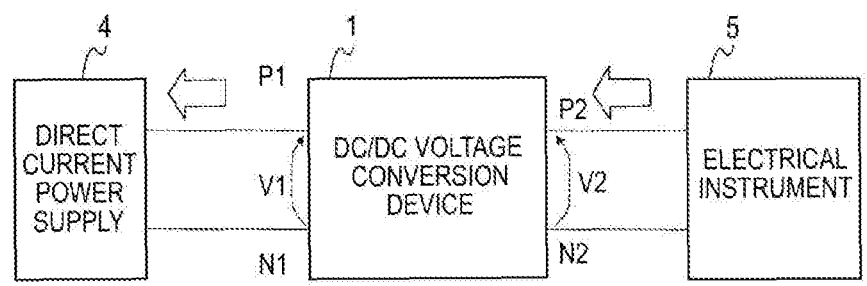
FIG. 3 is a block diagram schematically showing a voltage exchange and power flow between the primary side and secondary side of the DC-DC voltage conversion device in the first embodiment of the invention.

FIGS. 2 and 3 are diagrams schematically showing voltage conversion and a flow of power between the primary side and secondary side of the DC-DC voltage conversion device according to this embodiment. The diagrams represent a state wherein a direct current power supply 4 is connected to the positive electrode side terminal P1 and negative electrode side terminal N1 on the primary side of the DC-DC voltage conversion device 1, and an electrical instrument 5 is connected to the positive electrode side terminal P2 and negative electrode side terminal N2 on the secondary side.

In FIG. 2, a secondary battery, which is a lithium ion battery, nickel-metal hydride battery, or lead battery, or an electric double-layer capacitor or secondary battery combined with a power supply such as a photovoltaic cell or fuel cell, is used as the direct current power supply 4. Also, the electrical instrument 5 is an instrument combined with a power generating device or power storage device, including an electric load.

The DC-DC voltage conversion device 1 carries out voltage conversion based on a relationship between a primary side terminal voltage V1 and secondary side terminal voltage V2 such that V1≤V2, whereby power is exchanged reciprocally.

Herein, when the direct current power supply 4 carries out a discharging operation and the electrical instrument 5 carries out a power consuming operation, the DC-DC voltage conversion device 1 sends power by stepping up the voltage from the primary side in the direction of the secondary side, as shown in FIG. 2. Also, when the direct current power supply carries out a charging operation and the electrical instrument 5 carries out a power supplying operation, the DC-DC voltage conversion device 1 sends power by stepping down the voltage from the secondary side in the direction of the primary side, as shown in FIG. 3.

At this time, voltage conversion is carried out by a switch element in a power semiconductor unit included in the main conversion circuit 2 being controlled on and off by a gate drive signal 6 output from the control unit 3.

Figure 4:
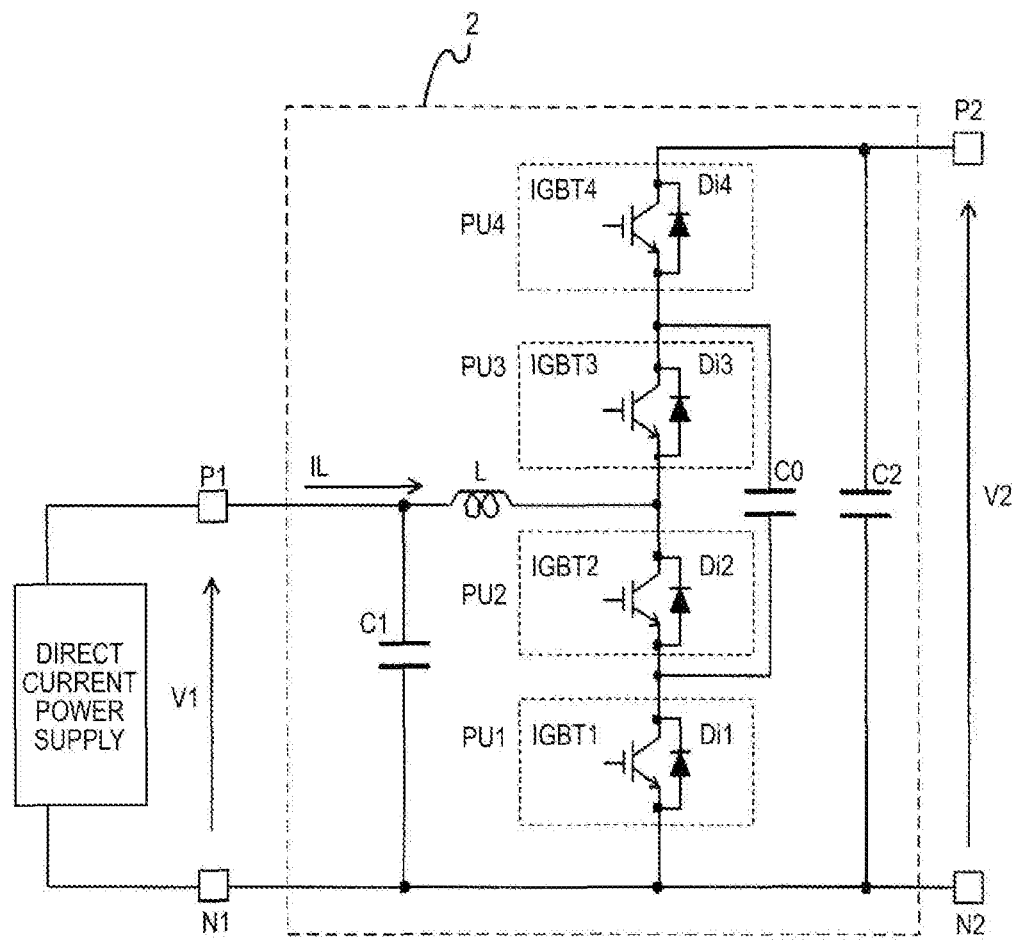
FIG. 4 is an overall configuration diagram of a main conversion circuit in the first embodiment of the invention.
Figure 5:
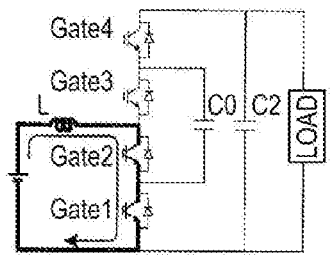
FIG. 5 is an operation diagram of a switching mode A when the DC-DC voltage conversion device in the first embodiment of the invention is discharging.
Figure 6:
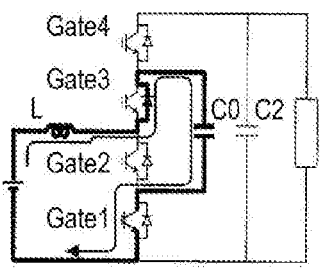
FIG. 6 is an operation diagram of a switching mode B when the DC-DC voltage conversion device in the first embodiment of the invention is discharging.
Figure 7:
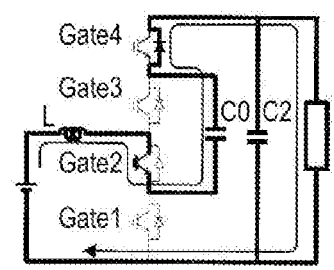
FIG. 7 is an operation diagram of a switching mode C when the DC-DC voltage conversion device in the first embodiment of the invention is discharging.
Figure 8:
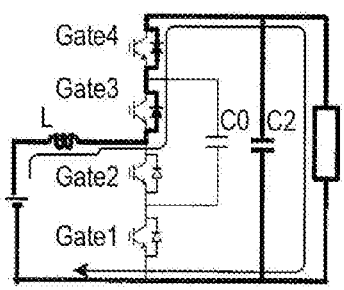
FIG. 8 is an operation diagram of a switching mode D when the DC-DC voltage conversion device in the first embodiment of the invention is discharging.
Figure 9:
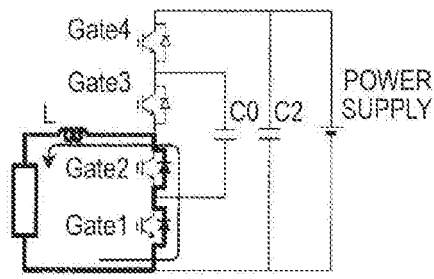
FIG. 9 is an operation diagram of the switching mode A when the DC-DC voltage conversion device in the first embodiment of the invention is charging.
Figure 10:
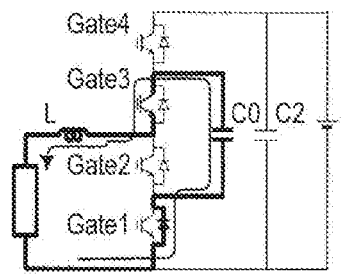
FIG. 10 is an operation diagram of the switching mode B when the DC-DC voltage conversion device in the first embodiment of the invention is charging.
Figure 11:
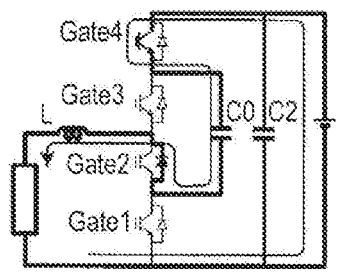
FIG. 11 is an operation diagram of the switching mode C when the DC-DC voltage conversion device in the first embodiment of the invention is charging.
Figure 12:
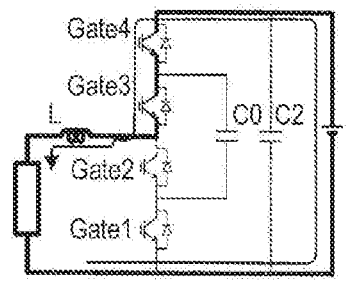
FIG. 12 is an operation diagram of the switching mode D when the DC-DC voltage conversion device in the first embodiment of the invention is charging.

FIG. 4 is a diagram showing an example of circuit wiring of the main conversion circuit 2, wherein the main conversion circuit 2 is configured of a smoothing capacitor C1 that smooths the primary side terminal voltage V1, a smoothing capacitor C2 that smooths the secondary side terminal voltage V2, an inductor L, an energy shifting capacitor C0, and first to fourth power semiconductor units PU1 to PU4 that have as a unit a body wherein a switch element and rectifying element are connected in parallel.

The four first to fourth power semiconductor units PU1 to PU4 are configured so that two pairs of power semiconductor units configured so that two power semiconductor units are connected in anti-parallel are connected in series, and stepped-up power is supplied from the primary side to the secondary side. Further, each of the power semiconductor units PU1 to PU4 is configured to have as a unit a body wherein a switch element and rectifying element are connected in parallel.

An insulated gate bipolar transistor (IGBT) is used as the switch element of each of the first to fourth power semiconductor units PU1 to PU4. Each of a first IGBT1, second IGBT2, third IGBT3, and fourth IGBT4 is employed, and first diode elements Di1, Di2, Di3, and Di4 are employed as rectifying elements. Hereafter, the rectifying elements will be used with the terminology standardized as "diode elements". The number of power semiconductor units is not limited to four.

The main conversion circuit 2 is configured of the first and second smoothing capacitors C1 and C2, which are connected between the positive electrode side terminals P1 and P2 and negative electrode side terminals N1 and N2 on the primary side and secondary side of the main conversion circuit 2 and smooth voltage, a power module (PU1 to PU4), including two or more pairs of power semiconductor units formed of two power semiconductor units (PU), each of which is formed by a switch element (hereafter referred to as an IGBT) and diode element (hereafter referred to as a Di) being connected in anti-parallel, wherein one power semiconductor unit in each pair is connected in series between the primary side positive electrode side terminal P1 and secondary side positive electrode side terminal P2, and the other power semiconductor units are connected in series between the primary side positive electrode side terminal P1 and secondary side negative electrode side terminal N2 in a direction the reverse that of the one power semiconductor units, the energy shifting capacitor C0, which is connected between secondary side ends of the one power semiconductor unit and other power semiconductor unit of each pair of power semiconductor units except the secondary side end pair of power semiconductor units, and the inductor L, which is connected between the pair of primary side end power semiconductor units and primary side positive electrode side terminal P1.

As shown in the drawing, the two terminals of the primary side smoothing capacitor C1 of the main conversion circuit 2 are connected to the primary side positive electrode side terminal P1 and negative electrode side terminal N1 of the main conversion circuit 2, and the negative electrode side terminal N1 is also connected to the secondary side negative electrode side terminal N2 of the main conversion circuit 2. The positive electrode side terminal P1 is connected to one terminal of the smoothing capacitor C1 and one terminal of the inductor L.

Also, the two terminals of the smoothing capacitor C2 are connected to the secondary side positive electrode side terminal P2 and negative electrode side terminal N2 of the main conversion circuit 2.

A collector terminal C of the fourth IGBT4 of the fourth power semiconductor unit PU4 is connected to the secondary side positive electrode side terminal P2 of the main conversion circuit 2, an emitter terminal E is connected to a collector terminal of the third IGBT3 of the third power semiconductor unit PU3, an emitter terminal of the third IGBT3 is connected to a collector terminal of the second IGBT2 of the second power semiconductor unit PU2, an emitter terminal of the second IGBT2 is connected to a collector terminal of the first IGBT1 of the first power semiconductor unit PU1, and an emitter terminal of the first IGBT1 is connected to the secondary side negative electrode side terminal N2.

The fourth diode element Di4 of the fourth power semiconductor unit PU4 is connected in anti-parallel to the fourth IGBT4, wherein an anode terminal A of the fourth diode element Di4 is connected to the emitter terminal E of the fourth IGBT4, and a cathode terminal K of the fourth diode element Di4 is connected to the collector terminal C of the fourth IGBT4. In the same way, the third diode element Di3, second diode element Di2, and first diode element Di1 are connected in anti-parallel to the third IGBT3, second IGBT2, and first IGBT1 respectively.

One terminal of the energy shifting capacitor C0 is connected to a connection point of the fourth IGBT4 and third IGBT3, while the other terminal is connected to a connection point of the second IGBT2 and first IGBT1.

As described above, one terminal of the inductor L is connected to a connection point of the primary side positive electrode side terminal P1 and terminal of the smoothing capacitor C1 of the main conversion circuit 2, while the other terminal is connected to a connection point of the third IGBT3 and second IGBT2.

That is, the main conversion circuit 2 is of a configuration wherein the smoothing capacitor C1 and inductor L are connected between the primary side positive electrode side terminal P1 and negative electrode side terminal N1, the serial body of power semiconductor units wherein a semiconductor switching element and diode element are connected in anti-parallel is connected between the secondary side positive electrode terminal and negative electrode terminal, a terminal of the inductor differing from a connection terminal for a terminal of the smoothing capacitor is connected to, of the serial body of power semiconductor units, a connection point of the second power semiconductor unit and third power semiconductor unit, and the energy shifting capacitor C0 is connected between a connection point of the first power semiconductor unit and second power semiconductor unit and a connection point of the third power semiconductor unit and fourth power semiconductor unit.

Signal lines are connected from the control unit 3 shown in FIG. 1 so that the gate drive signal 6 for controlling the IGBTs on and off is input into a fourth Gate4, third Gate3, second Gate2, and first Gate1 corresponding to the fourth IGBT4, third IGBT3, second IGBT2, and first IGBT1 respectively. The fourth IGBT4 performs a switching operation in accordance with a voltage change of the fourth Gate4 signal, the third IGBT3 performs a switching operation in accordance with a voltage change of the third Gate3 signal, the second IGBT2 performs a switching operation in accordance with a voltage change of the second Gate2 signal, and the first IGBT1 performs a switching operation in accordance with a voltage change of the first Gate1 signal.

Next, an operation of the main conversion circuit 2 will be described.

As previously described, the DC-DC voltage conversion device 1 converts voltage by stepping up voltage from the primary side to the secondary side or stepping down voltage from the secondary side to the primary side. The stepping up operation and stepping down operation are controlled by timing of the IGBTs being turned on and off being regulated by the fourth Gate4, third Gate3, second Gate2, and first Gate1, which are the gate drive signal 6.

Switching modes A, B, C, and D of the configuration shown in FIG. 4 when the DC-DC voltage conversion device is discharging, that is, performing a step-up operation, are shown in FIGS. 5 to 8 respectively. These operations will be described sequentially hereafter.

Also, switching modes A, B, C, and D of the configuration shown in FIG. 4 when the DC-DC voltage conversion device is charging, that is, performing a step-down operation, are shown in FIGS. 9 to 12 respectively. These operations will also be described sequentially hereafter.

The following cases of voltage conversion control using the gate drive signal 6 will be described, divided into cases of performing a step-up operation and cases of performing a step-down operation.

1. When the duty ratio is less than 50% when performing a step-up operation
2. When the duty ratio is equal to or greater than 50% when performing a step-up operation
3. When the duty ratio is less than 50% when performing a step-down operation 4. When the duty ratio is equal to or greater than 50% when performing a step-down operation 5. When performing a direct connection 1. When the Duty Ratio is Less than 50% when Performing a Step-Up Operation Note that the duty ratio relates to values of the first Gate1 signal and second Gate2 signal. The fourth Gate4 signal and third Gate3 signal are complementary to the first Gate1 signal and second Gate2 signal respectively, because of which the duty ratios of the fourth Gate4 signal and third Gate3 signal are in a relationship of 100%–(the duty ratio of the first Gate1 signal and second Gate2 signal).

Figure 13A:
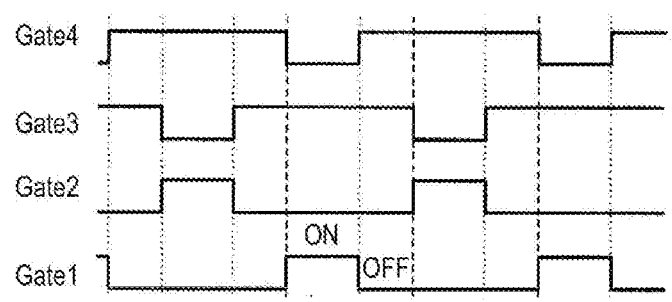
FIGS. 13A, 13B, and 13C are a waveform diagram of when the DC-DC voltage conversion device in the first embodiment of the invention is discharging with a step-up ratio of less than 2.
Figure 13B:
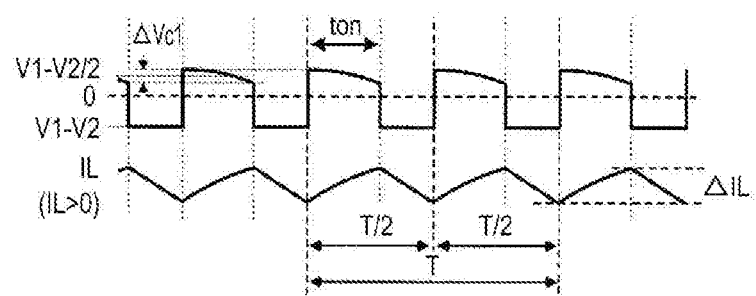
Figure 13C:
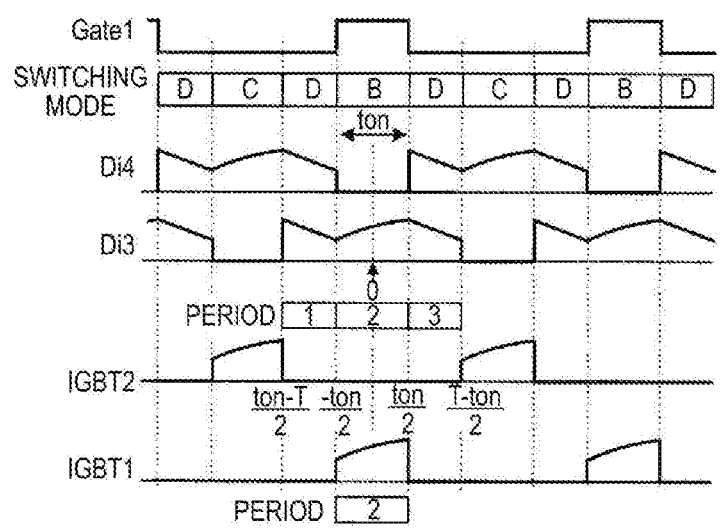

FIGS. 13A, 13B, and 13C show a case wherein the duty ratio of a gate drive signal is less than 50% when performing a step-up operation. FIG. 13A shows a gate drive signal S, FIG. 13B shows an inductor current IL, and FIG. 13C shows switching modes and timings of switching the switching modes.

Polarity of the inductor current IL flowing through the inductor L in a direction from a connection terminal on the positive electrode side terminal P1 to a connection terminal on the third IGBT3 side is positive polarity.

In FIGS. 13A, 13B, and 13C, the first IGBT1 is turned on when the first Gate1 signal is high (H), the second IGBT2 is turned on when the second Gate2 signal is high, and current flows from the collector toward the emitter.

In the same way, the third IGBT3 is turned on when the third Gate3 signal is high (H) and the fourth IGBT4 is turned on when the fourth Gate4 signal is high, but when performing a step-up operation, the current flows from the anode toward the cathode through the third diode element Di3 and fourth diode element Di4 connected in anti-parallel.

Herein, the first Gate1 signal and fourth Gate4 signal are complementary signals wherein high (H) and low (L) logic are opposite to each other, meaning that when the first Gate1 signal is high the fourth Gate4 signal is low, and when the first Gate1 signal is low the fourth Gate4 signal is high. Note that prevention time (dead time) is provided so that both are not simultaneously in an on-state due to a delay in response of the IGBT switching operations when switching between the high and low logic.

In the same way, the second Gate2 signal and third Gate3 signal are complementary signals wherein high and low logic are opposite to each other, and the phase difference between the first Gate1 signal and second Gate2 signal is 180 degrees. That is, the gate drive signal 6 has two sets of signals that form pairs as complementary signals, and the phase differences of each pair are of equal intervals.

At this time, combinations of the high and low logics of the gate drive signals of the first Gate1 to fourth Gate4 are categorized into the three kinds of switching mode B, C, and D, and switched in the order of B→D→C→D→B.

In switching mode B, the first IGBT1 and third IGBT3 are in an on-state while the second IGBT2 and fourth IGBT4 are in an off-state, the current flows along a path from the positive electrode side terminal P1 through the inductor L, third diode element Di3, energy shifting capacitor C0, first IGBT1, and negative electrode side terminal N1, and energy is stored in the inductor L and energy shifting capacitor C0. Voltage across the smoothing capacitor C2 accumulated by an operation to be described hereafter is applied to the electrical instrument 5, and energy is supplied from the smoothing capacitor C2.

As the first IGBT1 and third diode element Di3 are turned on and current flows through, the potential of a connection terminal on the first IGBT1 side of the energy shifting capacitor C0 is approximately Vcom=0. Also, the potential of a connection terminal on the third IGBT3 side is approximately VL. Therefore, a voltage VL of the connection terminal on the third IGBT3 side of the inductor L is a voltage Vc0 across the energy shifting capacitor C0.

In switching mode D, the third IGBT3 and fourth IGBT4 are in an on-state while the first IGBT1 and second IGBT2 are in an off-state, the current flows along a path from the positive electrode side terminal P1 through the inductor L, third diode element Di3, fourth diode element Di4, positive electrode side terminal P2, electrical instrument 5, and negative electrode side terminal N2, and energy accumulated in the inductor L is released.

Also, as current flows through the third diode element Di3 and fourth diode element Di4, the voltage VL becomes approximately V2, because of which the difference between the voltage of the connection terminal on the third IGBT3 side of the inductor L and the voltage of the connection terminal on the positive electrode side terminal P1 side is negative (V1−V2), and the inductor current IL decreases toward IL<0.

In switching mode C, the second IGBT2 and fourth IGBT4 are in an on-state while the first IGBT1 and third IGBT3 are in an off-state, the current flows along a path from the positive electrode side terminal P1 through the inductor L, second IGBT2, energy shifting capacitor C0, fourth diode element Di4, positive electrode side terminal P2, electrical instrument 5, and negative electrode side terminal N2, energy is stored in the inductor L, and energy is released from the energy shifting capacitor C0. Also, current also flows into the smoothing capacitor C2 at the same time, and energy is stored.

As the second IGBT2 and fourth diode element Di4 are turned on and current flows through, the potential of a connection terminal on the second IGBT2 side of the energy shifting capacitor C0 is approximately VL, and the potential of a connection terminal on the fourth IGBT4 side is approximately V2. Therefore, the voltage VL of the connection terminal on the third IGBT3 side of the inductor L is V2−Vc0.

Herein, as the duty ratios of the first Gate1 signal and second Gate2 signal are equal, the hourly averages of the voltage VL in switching modes B and C are equal, and Vc0 is in a relationship of Vc0=(V2−Vc0). Therefore, the voltage Vc0 across the energy shifting capacitor C0 is V2/2, one-half of the secondary side terminal voltage V2.

To summarize the foregoing description, the voltage VL of the connection terminal on the third IGBT3 side of the inductor L is such that VL=Vc0=V2/2 in switching mode B. Also, in switching mode C, VL=(V2−Vc0)=V2/2, and in switching mode D, VL=V2.

Because of this, a potential difference across the inductor L and a switched on time ton and switched off time toff of the first IGBT1 and second IGBT2 are expressed by the following relationships.

Switching Modes B and C:

$$L \cdot IL_{rpl} = \text{ton} \cdot (V1 - V2/2) \tag{1a}$$

Switching Mode D:

$$L \cdot IL_{rpl} = -\text{toff} \cdot (V1 - V2) \tag{1b}$$

Note that L indicates inductance of the inductor L, and ILrpl indicates the amplitude of a ripple current component (alternating current component) flowing through the inductor L.

As the left-side components of Expressions 1a and 1b are equal, the following relationship is established.

$$\text{ton} \cdot (V1 - V2/2) = \text{toff} \cdot (V2 - V1) \tag{2}$$

When arranging Expression 2 for the primary side terminal voltage V1 and secondary side terminal voltage V2, the following expression is obtained.

$$(V2/V1) = (ton + toff)/(ton + toff - ton + ton/2) \quad (3)$$
$$= 1/(1 - ton/T)$$

Note that ton+toff=T/2

The cycle T in Expression 3 indicates a period in which the switching modes are switched through one cycle in the order of B→D→C→D→B, and the ton period and toff period are included twice each in the cycle T. Consequently, ton+toff is T/2.

Also, the left-side component V2/V1 of Expression 3 is the ratio between the primary side voltage V1 and secondary side voltage V2 of the DC-DC voltage conversion device 1, and is the DC-DC voltage conversion ratio.

The operation when the duty ratio of the gate drive signal is less than 50% shown in FIGS. 13A, 13B, and 13C is such that ton/T<0.5, and when this is applied to Expression 3, the DC-DC voltage conversion ratio is less than 2. Therefore, V2<(V1×2).

From this, in switching modes B and C, the voltage VL of the connection terminal on the third IGBT3 side of the inductor L is VL=V2/2<V1, and the voltage of the connection terminal on the positive electrode side terminal P1 side of the inductor L is V1. Therefore, with VL as a reference, the potential difference across the inductor L is positive, and the inductor current IL increases in a positive direction.

As heretofore described, when switching the switching modes in the order of B→D→C→D→B, the inductor current IL changes further in a positive direction from a state of IL≥0 in switching modes B and C, and in switching mode D, the inductor current IL changes toward a state of IL<0.

Because of this, an increase and decrease of the inductor current IL during the switching cycle T of the IGBT are repeated twice in a cycle of T/2. That is, alternating current of a frequency twice the switching frequency of the IGBT flows through the inductor L.

Herein, current flowing through a power semiconductor unit is such that current flowing through a diode element is greater than current flowing through an IGBT, and diode elements become hottest among elements configuring a main conversion circuit, because of which determining the need or otherwise for an overheat protection operation is necessary for both diode element temperature and IGBT element temperature. This is because, although switching loss occurring when switching is generally greater in an IGBT element than in a diode element, current flowing through a diode element is greater than current flowing through an IGBT element, because of which the relationship between the magnitudes of the diode element temperature and IGBT element temperature becomes reversed in some cases.

There is a correlation between the temperatures of the fourth diode element Di4 and third diode element Di3 and the temperatures of the first IGBT1 and second IGBT2 energized in the same operating mode, which also depends on energizing time and a correlated step-up ratio. Because of this, the temperatures of the fourth diode element Di4 and third diode element Di3 are calculated by a correction calculation (temperatures of first IGBT1 and second IGBT2)×(temperature ratio coefficient), using a temperature ratio coefficient that is variable in accordance with the step-up ratio.

Figure 14:
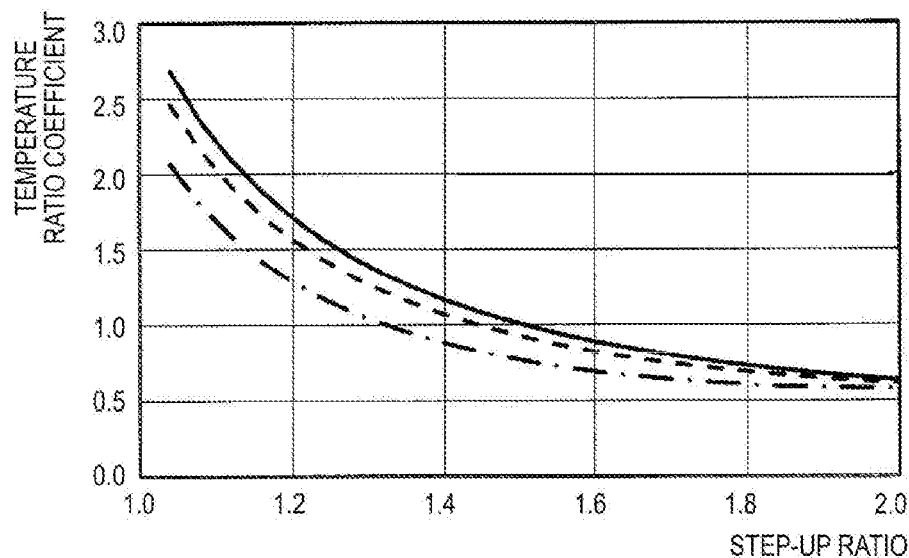
FIG. 14 is a characteristic diagram showing a temperature ratio coefficient of the DC-DC voltage conversion device in the first embodiment of the invention.
Figure 15:
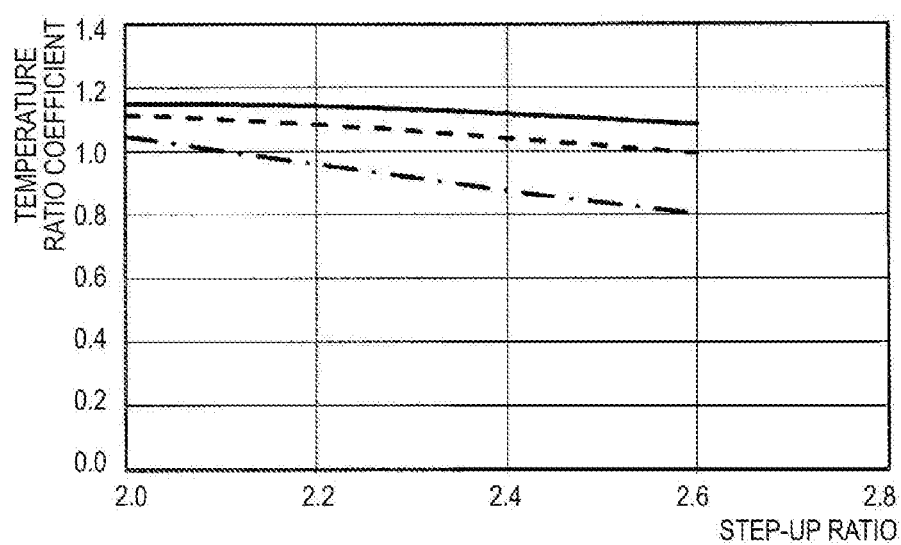
FIG. 15 is a characteristic diagram showing a temperature ratio coefficient of the DC-DC voltage conversion device in the first embodiment of the invention.

Examples of the relationship between step-up ratio and temperature ratio coefficient are shown in FIGS. 14 and 15. FIGS. 14 and 15 will be described in detail hereafter.

Next, a description will be given of a configuration from diode element temperature calculation to overheat protection calculation.

Figure 16:
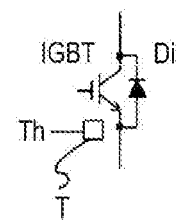
FIG. 16 is a configuration diagram of a power semiconductor unit in the first embodiment of the invention.

FIG. 16 is a diagram showing a configuration of a power semiconductor unit.

A configuration including a temperature sensor T is adopted as means of detecting power semiconductor element temperature. The power semiconductor element temperature can be accurately detected by, for example, a thermistor or an element having a temperature detecting function, such as a temperature detecting diode, being incorporated in the power semiconductor unit as the temperature sensor T.

When using a thermistor for temperature detection, a resistor connected in series with the thermistor is disposed, and a predetermined voltage is applied to the serial body of the resistor and thermistor, after which the voltage of a connection portion of the resistor and thermistor is read using an A/D converter included in a microprocessor, and the temperature is detected by referring to a table in the microprocessor, or the like, in response to the reading fluctuating as the thermistor resistance changes due to a change in the power semiconductor element temperature.

Also, when using a temperature detecting diode, a forward voltage Vf generated between an anode (A) and cathode (K) of the diode is read by an A/D converter included in a microprocessor while causing a constant current to flow into the temperature detecting diode, and in the way previously described, the temperature is detected by referring to a table in the microprocessor, or the like, in response to the reading fluctuating as Vf fluctuates due to a change in the power semiconductor element temperature. The temperature sensor T may also be of a configuration other than those heretofore described.

Figure 17:
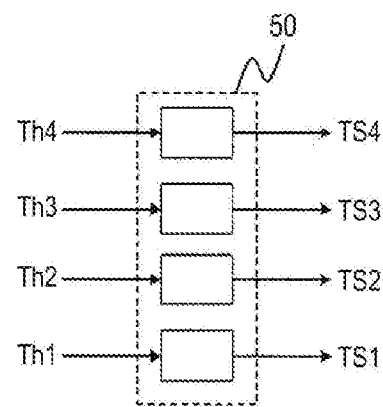
FIG. 17 is a block diagram of a temperature information calculation unit in the first embodiment of the invention.

FIG. 17 is a block diagram of a temperature information calculation unit 50 that calculates power semiconductor element temperature information. As shown in FIG. 17, temperature signals Th1 to Th4 of the first IGBT1 to fourth IGBT4 respectively are detected by the temperature sensor T, and temperatures TS1 to TS4 of the first IGBT1 to fourth IGBT4 are obtained by the temperature information calculation unit 50 by the previously described table reference or the like.

Figure 18:
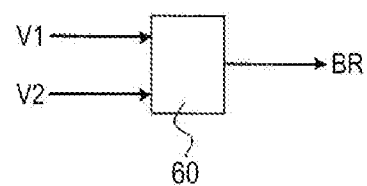
FIG. 18 is a block diagram of a temperature ratio calculation unit in the first embodiment of the invention.

FIG. 18 shows a configuration of a step-up ratio calculation unit 60, wherein the step-up ratio calculation unit 60, based on voltage information V1 and V2, calculates a step-up ratio BR using a division operation whereby V2 is divided by V1. The voltage information V1 and V2 are data read by, for example, an A/D converter of a microprocessor, but may fluctuate in accordance with switching of an IGBT of the main conversion circuit 2, or with an application of noise caused by the switching. In this case, processing is carried out as appropriate by a high-cut filter (low-pass filter) operation being performed on the calculated value by the step-up ratio calculation unit, or the like.

Figure 19:
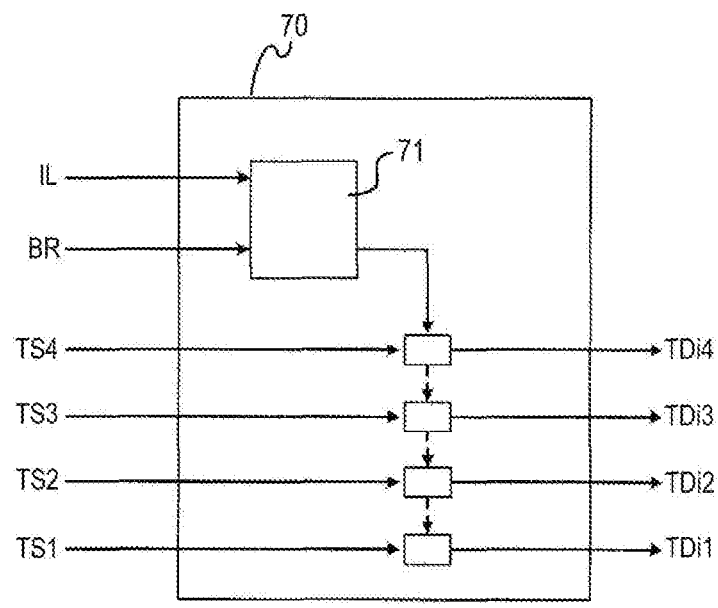
FIG. 19 is a block diagram of a diode element temperature calculation unit in the first embodiment of the invention.

FIG. 19 shows a configuration of a diode element temperature calculation unit 70, including therein temperature ratio coefficient calculation means 71. The temperature ratio coefficient calculation means 71, using the temperature ratio coefficient characteristics shown as examples in FIGS. 14 and 15, calculates a temperature ratio coefficient from the inductor current IL and step-up ratio BR by referring to a table, or the like. Furthermore, diode element temperatures TDi1 to TDi4 are calculated in the diode element temperature calculation unit 70, which calculates diode element temperature information, by the temperatures TS1 to TS4 of the first IGBT1 to fourth IGBT4 being multiplied by the temperature ratio coefficient. The temperature ratio coefficient characteristics shown in FIGS. 14 and 15 are divided as shown in FIGS. 14 and 15 according to whether a discharging operation or charging operation is being carried out, and whether the step-up ratio is less than 2 or equal to or greater than 2.

When the DC-DC voltage conversion device carries out a discharging operation, the temperature ratio coefficients of the fourth diode element Di4 and third diode element Di3 temperatures with respect to the first IGBT1 and second IGBT2 element temperatures are referenced using the characteristics shown in FIG. 14. In the case of a discharging operation, there is no clear correlation between the first diode element Di1 and second diode element Di2 temperatures and the first IGBT1, second IGBT2, third IGBT3, and fourth IGBT4 element temperatures, and no current is flowing, because of which a rise in element temperature large enough to affect the necessity or otherwise of overheat protection is not expected. Because of this, it is sufficient that the temperature ratio coefficients relating to calculation of the first diode element Di1 and second diode element Di2 temperatures are set at zero.

Also, when the DC-DC voltage conversion device carries out a charging operation, the temperature ratio coefficients of the second diode element Di2 and first diode element Di1 temperatures with respect to the third IGBT3 and fourth IGBT4 element temperatures are referenced using the characteristics shown in FIG. 15. In the case of a charging operation, there is no clear correlation between the third diode element Di3 and fourth diode element Di4 temperatures and the first IGBT1, second IGBT2, third IGBT3, and fourth IGBT4 element temperatures, and no current is flowing, because of which a rise in element temperature large enough to affect the necessity or otherwise of overheat protection is not expected. Because of this, it is sufficient that the temperature ratio coefficients relating to calculation of the third diode element Di3 and fourth diode element Di4 temperatures are set at zero.

Figure 20:
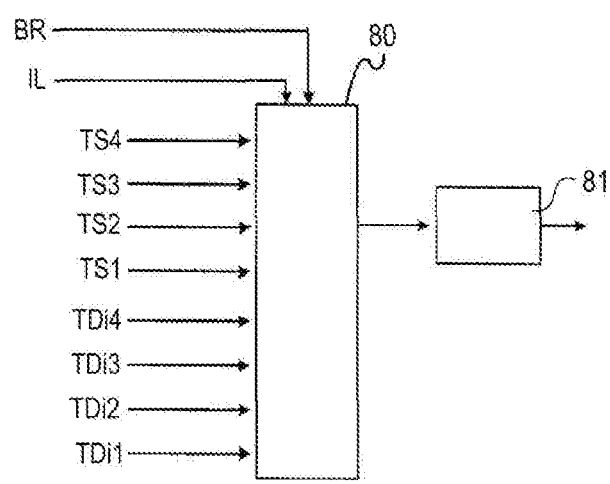
FIG. 20 is a block diagram representing overheat protection necessity determination input and output in the first embodiment of the invention.

Continuing, a description will be given of operations of an overheat protection necessity determination unit 80 and overheat protection calculation means 81 shown in FIG. 20. The overheat protection necessity determination unit 80 determines the necessity or otherwise of overheat protection based on IGBT element temperature and diode element temperature. Determination of the necessity or otherwise of overheat protection is basically carried out based on the highest value among the temperatures from the temperature TS1 of the first IGBT1 to the temperature TS4 of the fourth IGBT4 and the temperature TDi1 of the first diode element Di1 to the temperature TDi4 of the fourth diode element Di4, but when wishing the element heat resistance temperature settings of the first IGBT1 to fourth IGBT4 and first diode element Di1 to fourth diode element Di4 to be different settings, or when wishing to change the determination threshold of the necessity or otherwise of overheat protection in accordance with the step-up ratio BR and inductor current IL values, or in accordance with a state of distribution of the temperatures from the temperature TS1 of the first IGBT1 to the temperature TS4 of the fourth IGBT4 and the temperature TDi1 of the first diode element Di1 to the temperature TDi4 of the fourth diode element Di4, or the like, determination logic is contrived as appropriate in the overheat protection necessity determination unit.

The overheat protection calculation means 81 takes in protection target temperature information output from the overheat protection necessity determination unit 80, and calculates a control amount for carrying out overheat protection. The control amount is such that values between one predetermined threshold and a second threshold are calculated by carrying out a linear interpolation between 100% of the control amount and 0% of the control amount, or values from 100% of the control amount to 0% of the control amount are set by referencing a table, or the like.

Information on the calculated control amount is transmitted to an unshown other device, and the discharge amount or charge amount of the DC-DC voltage conversion device is regulated so as to avoid a state of overheat. That is, overheat protection means is configured so as to carry out overheat protection in accordance with a result from the overheat protection necessity determination unit 80.

The operations relating to FIGS. 16 to 20 also apply to other operating modes to be described hereafter.

2. When the Duty Ratio is Equal to or Greater than 50% when Performing a Step-Up Operation Next, a description will be given of a case wherein the duty ratio of the gate drive signal is equal to or greater than 50% when performing a step-up operation.

Figure 21A:
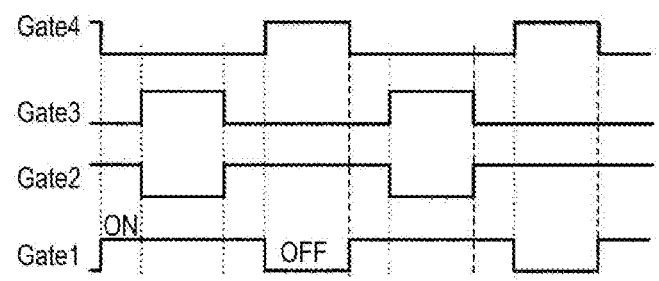
FIGS. 21A, 21B, and 21C are a waveform diagram of when the DC-DC voltage conversion device in the first embodiment of the invention is discharging with a step-up ratio equal to or greater than 2.
Figure 21B:
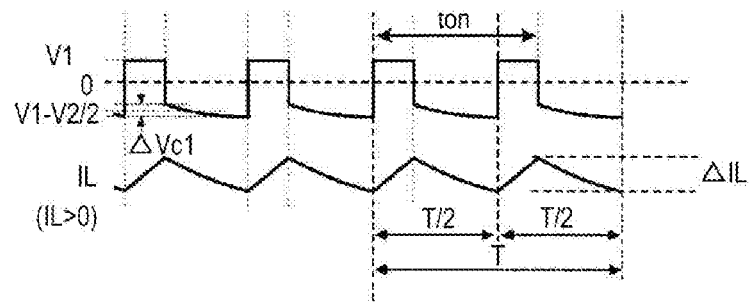
Figure 21C:
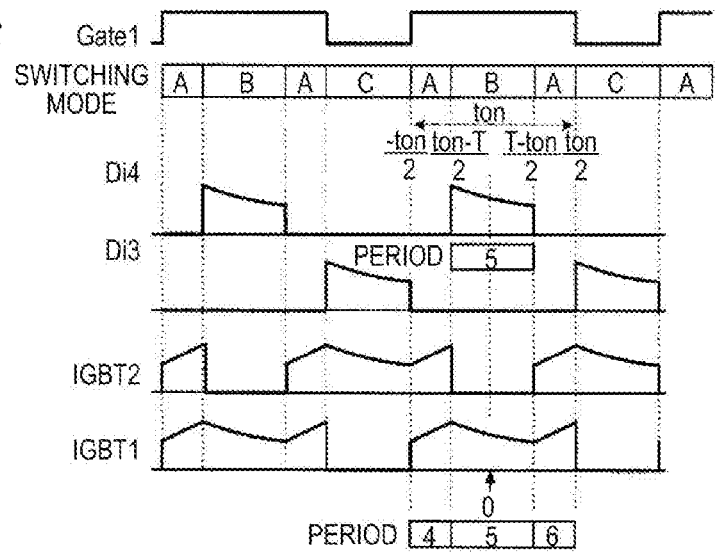

FIGS. 21A, 21B, and 21C show operation waveforms at relevant times, wherein FIG. 21A shows a gate drive signal, FIG. 21B shows the inductor current IL, and FIG. 21C shows switching modes and timings of switching the switching modes.

In FIG. 21A, the first IGBT1 is turned on when the first Gate1 signal is high (H), the second IGBT2 is turned on when the second Gate2 signal is high, and current flows from the collector toward the emitter.

The third IGBT3 is turned on when the third Gate3 signal is high, and the fourth IGBT4 is turned on when the fourth Gate4 signal is high. When performing a step-up operation, the current flows from the anode toward the cathode through the third diode element Di3 and fourth diode element Di4 connected in anti-parallel.

Also, the first Gate1 signal and fourth Gate4 signal, and the second Gate2 signal and third Gate3 signal, are complementary signals, and prevention time (dead time) is provided so that both are not simultaneously in an on-state due to a delay in response of the IGBT switching operations when switching between the high and low logic. The phase difference between the first Gate1 signal and second Gate2 signal is 180 degrees.

At this time, combinations of the high and low logics of the gate drive signals of the first Gate1 to fourth Gate4 are categorized into the three kinds of switching mode A, B, and C, and switched in the order of A→B→A→C→A.

Firstly, in switching mode A, the first IGBT1 and second IGBT2 are in an on-state while the third IGBT3 and fourth IGBT4 are in an off-state, the current flows along a path from the positive electrode side terminal P1 through the inductor L, second IGBT2, first IGBT1, and negative electrode side terminal N1, and energy is accumulated in the inductor L.

As current flows through the first IGBT1 and second IGBT2, the voltage VL is approximately Vcom=0, the difference between the voltage VL of the connection terminal on the second IGBT2 side of the inductor L and the voltage of the connection terminal on the positive electrode side terminal P1 side is (V1−0), and the inductor current IL increases in a positive direction.

In switching mode B, the first IGBT1 and third IGBT3 are in an on-state while the second IGBT2 and fourth IGBT4 are in an off-state, the current flows along a path from the positive electrode side terminal P1 through the inductor L, third diode element Di3, energy shifting capacitor C0, first IGBT1, and negative electrode side terminal N1, energy is released from the inductor L, and stored in the energy shifting capacitor C0. Voltage across the smoothing capacitor C2 accumulated by an operation to be described hereafter is applied to the electrical instrument 5, and energy is supplied from the smoothing capacitor C2.

As the first IGBT1 and third diode element Di3 are turned on and current flows through, the potential of the connection terminal on the first IGBT1 side of the energy shifting capacitor C0 is approximately Vcom=0, and the potential of the connection terminal on the third IGBT3 (third diode element Di3) side is approximately VL.

Therefore, the voltage VL of the connection terminal on the third IGBT3 (third diode element Di3) side of the inductor L is Vc0.

In switching mode C, the second IGBT2 and fourth IGBT4 are in an on-state while the first IGBT1 and third IGBT3 are in an off-state, the current flows along a path from the positive electrode side terminal P1 through the inductor L, second IGBT2, energy shifting capacitor C0, fourth diode element Di4, positive electrode side terminal P2, electrical instrument 5, and negative electrode side terminal N2, and energy is released from the inductor L and energy shifting capacitor C0.

As the second IGBT2 and fourth diode element Di4 are turned on and current flows through, the potential of the connection terminal on the second IGBT2 side of the energy shifting capacitor C0 is approximately VL, and the potential of the connection terminal on the fourth IGBT4 (fourth diode element Di4) side is approximately V2.

Therefore, the voltage VL of the connection terminal on the third IGBT3 side of the inductor L is V2−Vc0.

Also, in the same way as in the previously described case of an operation when the duty ratio is less than 50%, the duty ratios of the first Gate1 signal and second Gate2 signal are equal, because of which the hourly averages of the voltage VL in switching modes B and C are equal, and Vc0 is in a relationship of (V2−Vc0). Therefore, the voltage Vc0 across the energy shifting capacitor C0 is V2/2, one-half of the secondary side terminal voltage V2.

To summarize the foregoing description, the voltage VL of the connection terminal on the third IGBT3 side of the inductor L is such that VL=0 in switching mode A, VL=Vc0=V2/2 in switching mode B, and VL=(V2−Vc0)=V2/2 in switching mode C.

Because of this, the potential difference across the inductor L and the switched on time ton and switched off time toff of the first IGBT1 and second IGBT2 are expressed by the following relationships.

Switching Mode A:

$$L \cdot ILrpl = (ton - toff)/2 \cdot V1 \quad (4a)$$

Switching Modes B and C:

$$L \cdot ILrpl = -toff \cdot (V1 - V2/2) \quad (4b)$$

As the left-side components of Expressions 4a and 4b are equal, the following relationship is established.

$$(ton - toff)/2 \cdot V1 = -toff \cdot (V1 - V2/2) \quad (5)$$

When arranging Expression 5 for the primary side terminal voltage V1 and secondary side terminal voltage V2, the following expression is obtained.

$$(V2/V1) = (ton + toff)/toff \quad (6)$$

$$= 1/(1 - ton/T)$$

Note that ton+toff=T

The cycle T in Expression 6 indicates a period in which the switching modes are switched through one cycle in the order of A→B→A→C→A, and the ton period and toff period are included once each in the cycle T. ton+toff=T.

Expression 6 is equivalent to Expression 3, that is, the DC-DC voltage conversion ratio is continuously regulated in accordance with a change in the duty ratio regardless of whether the duty ratio is less than 50% or equal to or greater than 50%.

The operation when the duty ratio of the gate drive signal is equal to or greater than 50% shown in FIGS. 21A, 21B, and 21C is such that ton/T≥0.5, and when this is applied to Expression 6, the DC-DC voltage conversion ratio is 2 or greater. Therefore, V2≥(V1×2).

From this, in switching modes B and C, the voltage VL of the connection terminal on the third IGBT3 side of the inductor L is VL=V2/2≥V1, and the voltage of the connection terminal on the positive electrode side terminal P1 side of the inductor L is V1. Therefore, with VL as a reference, the potential difference across the inductor L is negative, and the inductor current IL decreases in a negative direction.

As heretofore described, when switching the switching modes in the order of A→B→A→C→A, the inductor current IL changes so as to increase further in a positive direction from a state of IL≥0 in switching mode A, and in switching modes B and C, the inductor current IL changes toward a state of IL<0.

Because of this, an increase and decrease of the inductor current IL during the switching cycle T of the IGBT are repeated twice in a cycle of T/2. That is, in a case in which the duty ratio of the gate drive signal is equal to or greater than 50% too, alternating current of a frequency twice the switching frequency of the IGBT flows through the inductor L.

Herein, current flowing through a power semiconductor unit is such that current flowing through an IGBT is greater than current flowing through a diode element, and as IGBT elements become hottest among elements configuring a main conversion circuit, it is necessary to determine the need or otherwise for an overheat protection operation based on the IGBT temperature.

As previously described, IGBT temperature is detected by the temperature sensor T, because of which the need or otherwise for overheat protection can be determined using a temperature signal of the temperature sensor T.

3. When the Duty Ratio is Less than 50% when Performing a Step-Down Operation

As shown in FIG. 3, a step-down operation is such that, with a relationship wherein voltage V1≤voltage V2, power generated by the electrical instrument 5 connected to the secondary side of the DC-DC voltage conversion device 1 is subjected to a DC-DC voltage conversion from V2 to V1, and collected in the direct current power supply 4.

Figure 22A:
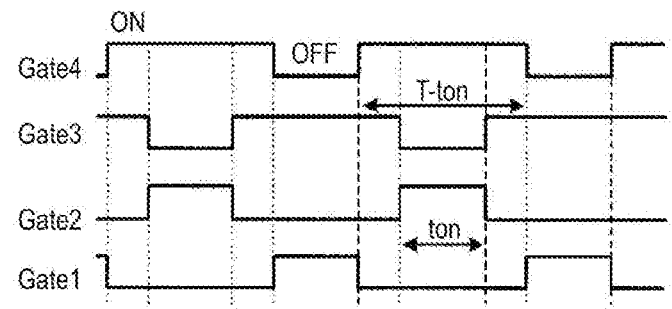
FIGS. 22A, 22B, and 22C are a waveform diagram of when the DC-DC voltage conversion device in the first embodiment of the invention is charging with a step-up ratio of less than 2.
Figure 22B:
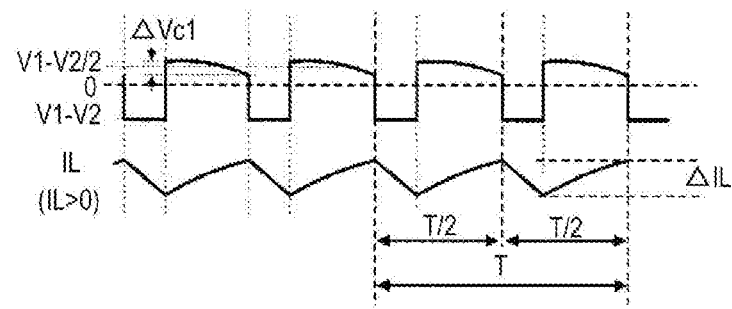
Figure 22C:
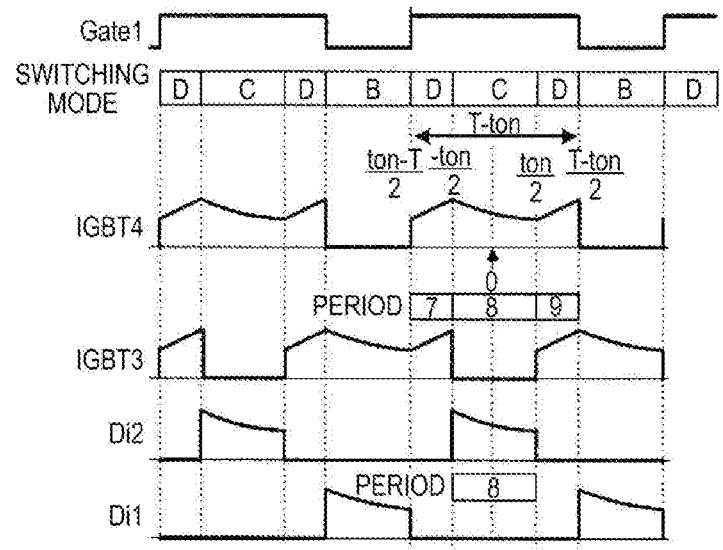

FIGS. 22A, 22B, and 22C show waveforms in a case wherein the duty ratio of a gate drive signal is less than 50% when performing a step-down operation. FIG. 22A shows a gate drive signal, FIG. 22B shows the inductor current IL, and FIG. 22C shows switching modes and timings of switching the switching modes.

The first Gate1 to fourth Gate4 of FIGS. 22A, 22B, and 22C are such that the third IGBT3 is turned on when the third Gate3 signal is high, the fourth IGBT4 is turned on when the fourth Gate4 signal is high, and current flows from the collector toward the emitter. The first IGBT1 is turned on when the first Gate1 signal is high, and the second IGBT2 is turned on when the second Gate2 signal is high, but when performing a step-down operation, the current flows from the anode toward the cathode through the first diode element Di1 and second diode element Di2 connected in anti-parallel.

The gate drive signals of the first Gate1 to fourth Gate4 of FIG. 22A, and the switching modes and timings of switching the switching modes of FIG. 22C, are the same as those in FIGS. 13A, 13B, and 13C when the duty ratio of the gate drive signal is less than 50% when performing a step-up operation.

That is, the gate drive signals have the same waveforms both when performing a step-down operation and when performing a step-up operation, and combinations of the high and low logics of the gate drive signals of the first Gate1 to fourth Gate4 are switched in the order of switching modes B→D→C→D→B.

In switching mode D, the third IGBT3 and fourth IGBT4 are in an on-state while the first IGBT1 and second IGBT2 are in an off-state, the current flows along a path from the positive electrode side terminal P2 through the fourth IGBT4, third IGBT3, inductor L, positive electrode side terminal P1, direct current power supply 4, and negative electrode side terminal N1, and energy is accumulated in the inductor L. Owing to the direction of the current flow, the polarity of the inductor current IL is negative.

Also, as the third IGBT3 and fourth IGBT4 are turned on and current flows through, the voltage VL becomes approximately V2.

Therefore, the difference between the voltage of the connection terminal on the third IGBT3 side of the inductor L and the voltage of the connection terminal on the positive electrode side terminal P1 side is negative (V1−V2), and the inductor current IL increases in a negative direction from a state of IL<0.

In switching mode B, the first IGBT1 and third IGBT3 are in an on-state while the second IGBT2 and fourth IGBT4 are in an off-state, the current flows along a path from the energy shifting capacitor C0 through the third IGBT3, inductor L, positive electrode side terminal P1, direct current power supply 4, negative electrode side terminal N1, and first diode element Di1, and energy is released from the inductor L and energy shifting capacitor C0. Also, the voltage V2 generated by the electrical instrument 5 is applied to the smoothing capacitor C2, and energy is supplied to the smoothing capacitor C2.

As the first IGBT1 (first diode element Di1) and third IGBT3 are turned on and current flows through, the potential of the connection terminal on the first IGBT1 (first diode element Di1) side of the energy shifting capacitor C0 is approximately Vcom=0, and the potential of the connection terminal on the third IGBT3 side is approximately VL.

Therefore, the voltage VL of the connection terminal on the third IGBT3 side of the inductor L is Vc0.

In switching mode C, the second IGBT2 and fourth IGBT4 are in an on-state while the first IGBT1 and third IGBT3 are in an off-state, the current flows along a path from the positive electrode side terminal P2 through the fourth IGBT4, energy shifting capacitor C0, second diode element Di2, inductor L, positive electrode side terminal P1, direct current power supply 4, and negative electrode side terminal N1, energy is released from the inductor L, and energy is stored in the energy shifting capacitor C0.

As the second diode element Di2 and fourth IGBT4 are turned on and current flows through, the potential of the connection terminal on the second IGBT2 (second diode element Di2) side of the energy shifting capacitor C0 is approximately VL, and the potential of the connection terminal on the fourth IGBT4 side is approximately V2.

Therefore, the voltage VL of the connection terminal on the third IGBT3 side of the inductor L is V2−Vc0.

Herein, as the duty ratios of the third Gate3 signal and fourth Gate4 signal are equal, the hourly averages of the voltage VL in switching modes B and C are equal, and Vc0 is in a relationship of Vc0=(V2−Vc0).

Therefore, in the same way as when performing a step-up operation, the voltage Vc0 across the energy shifting capacitor C0 is V2/2, one-half of the secondary side terminal voltage V2.

To summarize the foregoing description, the voltage VL of the connection terminal on the third IGBT3 side of the inductor L is such that VL=Vc0=V2/2 in switching mode B, VL=(V2−Vc0)=V2/2 in switching mode C, and VL=V2 in switching mode D.

Because of this, the potential difference across the inductor L and the switched on time ton and switched off time toff of the first IGBT1 and second IGBT2 are the same as in Expressions 1a and 1b, which indicate the relationship when the duty ratio of the gate drive signal is less than 50% when performing a step-up operation.

Because of this, the relationships of Expressions 2 and 3 are established in the same way. That is, the voltage conversion ratio (V2/V1) of the DC-DC voltage conversion device 1 is shown in Expression 3.

The operation when the duty ratio of the gate drive signal is less than 50% shown in FIGS. 22A, 22B, and 22C is such that ton/T<0.5, and when this is applied to Expression 3, the DC-DC voltage conversion ratio is less than 2. Therefore, V2<(V1×2). That is, the primary side terminal voltage V1 is a stepped-down voltage higher than one-half, lower than 100%, of the secondary side terminal voltage V2.

From this, in switching modes B and C, the voltage VL of the connection terminal on the third IGBT3 side of the inductor L is such that VL=V2/2<V1, and the voltage of the connection terminal on the positive electrode side terminal P1 side of the inductor L is V1. Therefore, with VL as a reference, the potential difference across the inductor L is positive, and the inductor current IL decreases in a positive direction. That is, the inductor current IL changes from a state of IL<0 toward a state of IL≥0 when performing a step-down operation.

As heretofore described, when switching the switching modes in the order of B→D→C→D→B, the inductor current IL changes toward a state of IL≥0 in switching modes B and C, and in switching mode D, the inductor current IL changes so as to increase further in a negative direction from a state of IL<0.

Because of this, an increase and decrease of the inductor current IL during the switching cycle T of the IGBT are repeated twice in a cycle of T/2. That is, in the same way as when performing a step-up operation, alternating current of a frequency twice the switching frequency of the IGBT flows through the inductor L.

Herein, current flowing through a power semiconductor unit is such that current flowing through an IGBT is greater than current flowing through a diode element, and as IGBT elements become hottest among elements configuring a main conversion circuit, it is necessary to determine the need or otherwise for an overheat protection operation based on the IGBT temperature.

4. When the Duty Ratio is Equal to or Greater than 50% when Performing a Step-Down Operation Next, a description will be given of a case wherein the duty ratio of the gate drive signal is equal to or greater than 50% when performing a step-down operation.

Figure 23A:
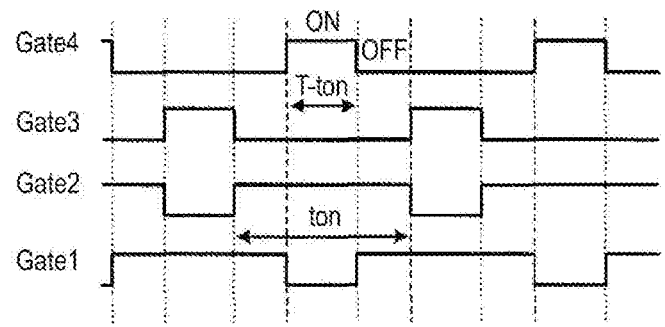
FIGS. 23A, 23B, and 23C are a waveform diagram of when the DC-DC voltage conversion device in the first embodiment of the invention is charging with a step-up ratio equal to or greater than 2.
Figure 23B:
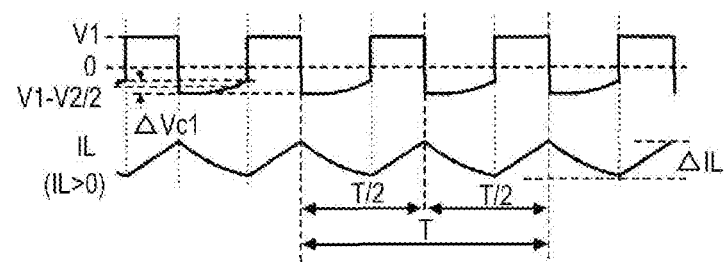
Figure 23C:
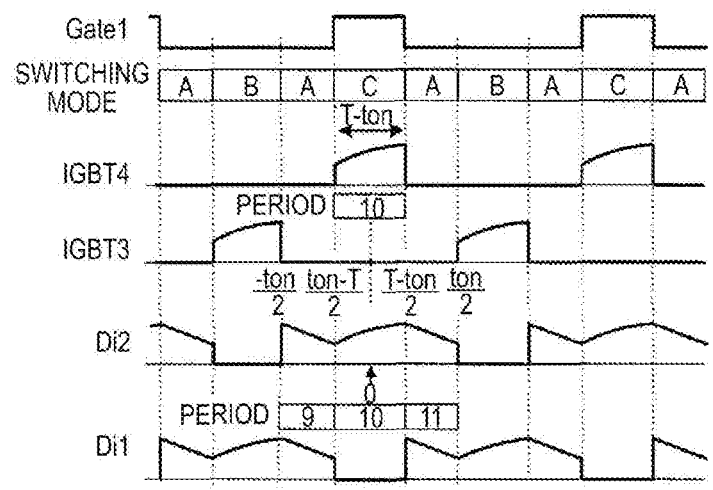

FIGS. 23A, 23B, and 23C show operation waveforms at relevant times, wherein FIG. 23A shows a gate drive signal, FIG. 23B shows the inductor current IL, and FIG. 23C shows switching modes and timings of switching the switching modes.

In FIG. 23A, the third IGBT3 is turned on when the third Gate3 signal is high, the fourth IGBT4 is turned on when the fourth Gate4 signal is high, and current flows from the collector toward the emitter.

The first IGBT1 is turned on when the first Gate1 signal is high, and the second IGBT2 is turned on when the second Gate2 signal is high, but when performing a step-down operation, the current flows from the anode toward the cathode through the first diode element Di1 and second diode element Di2 connected in anti-parallel.

The gate drive signals, and the switching modes and timings of switching the switching modes, of FIGS. 23A, 23B, and 23C are the same as those in FIGS. 21A, 21B, and 21C when the duty ratio of the gate drive signal is equal to or greater than 50% when performing a step-up operation.

That is, the gate drive signals have the same waveforms both when performing a step-down operation and when performing a step-up operation, and combinations of the high and low logics of the gate drive signals of the first Gate1 to fourth Gate4 are switched in the order of switching modes A→B→A→C→A.

Firstly, in switching mode C, the second IGBT2 and fourth IGBT4 are in an on-state while the first IGBT1 and third IGBT3 are in an off-state, the current flows along a path from the positive electrode side terminal P2 through the fourth IGBT4, energy shifting capacitor C0, second diode element Di2, inductor L, direct current power supply 4, and negative electrode side terminal N1, and energy is stored in the inductor L and energy shifting capacitor C0.

As the second IGBT 2 (second diode element Di2) and fourth IGBT4 are turned on and current flows through, the potential of the connection terminal on the second IGBT2 side of the energy shifting capacitor C0 is approximately VL, and the potential of the connection terminal on the fourth IGBT4 side is approximately V2.

Therefore, the voltage VL of the connection terminal on the third IGBT3 side of the inductor L is such that VL=V2−Vc0.

In switching mode B, the first IGBT1 and third IGBT3 are in an on-state while the second IGBT2 and fourth IGBT4 are in an off-state, the current flows along a path from the energy shifting capacitor C0 through the third IGBT3, inductor L, positive electrode side terminal P1, direct current power supply 4, negative electrode side terminal N1, and first diode element Di1, energy is stored in the inductor L, and energy is released from the energy shifting capacitor C0.

As the first IGBT1 (first diode element Di1) and third IGBT3 are turned on and current flows through, the potential of the connection terminal on the first IGBT1 side of the energy shifting capacitor C0 is approximately Vcom=0, and the potential of the connection terminal on the third IGBT3 side is approximately VL.

Therefore, the voltage VL of the connection terminal on the third IGBT3 side of the inductor L is Vc0.

In switching mode A, the first IGBT1 and second IGBT2 are in an on-state while the third IGBT3 and fourth IGBT4 are in an off-state, the current flows along a path from the inductor L through the positive electrode side terminal P1, direct current power supply 4, negative electrode side terminal N1, first diode element Di1, and second diode element Di2, and energy is released from the inductor L.

As current flows through the first diode element Di1 and second diode element Di2, the voltage VL is approximately Vcom=0, because of which the difference between the voltage VL of the connection terminal on the second IGBT2 side of the inductor L and the voltage of the connection terminal on the positive electrode side terminal P1 side is positive at V1, and the inductor current IL changes in a positive direction from a state of IL<0.

Also, in the same way as with the operation when the duty ratio is less than 50%, the duty ratios of the third Gate3 signal and fourth Gate4 signal are equal, because of which the hourly averages of the voltage VL in switching modes B and C are equal, and a relationship is such that Vc0=(V2−Vc0). Therefore, in the same way as when performing a step-up operation, the voltage Vc0 across the energy shifting capacitor C0 is V2/2, one-half of the secondary side terminal voltage V2.

To summarize the foregoing description, the voltage VL of the connection terminal on the third IGBT3 side of the inductor L is such that VL=Vcom=0 in switching mode A, VL=Vc0=V2/2 in switching mode B, and VL=(V2−Vc0)=V2/2 in switching mode C.

Because of this, the relationship between the potential difference across the inductor L and the switched on time ton and switched off time toff of the first IGBT1 and second IGBT2 are the same as in Expressions 4a and 4b, which indicate the relationship when the duty ratio of the gate drive signal is equal to or greater than 50% when performing a step-up operation. Because of this, the relationships of Expressions 5 and 6 are established in the same way.

That is, the voltage conversion ratio (V2/V1) of the DC-DC voltage conversion device 1 is shown in Expression 6.

The operation when the duty ratio of the gate drive signal is equal to or greater than 50% shown in FIGS. 23A, 23B, and 23C is such that ton/T≥0.5, and when this is applied to Expression 6, the DC-DC voltage conversion ratio is 2 or greater. Therefore, V2 (V1×2). That is, the primary side terminal voltage V1 is a stepped-down voltage lower than one-half of the secondary side terminal voltage V2.

From this, in switching modes B and C, the voltage VL of the connection terminal on the third IGBT3 side of the inductor L is such that VL=V2/2≥V1, and the voltage of the connection terminal on the positive electrode side terminal P1 side of the inductor L is V1. Therefore, with VL as a reference, the potential difference across the inductor L is negative, and the inductor current IL increases in a negative direction. That is, the inductor current IL changes so as to increase further in a negative direction from a state of IL<0 when performing a step-down operation.

As heretofore described, when switching the switching modes in the order of A→B→A→C→A, the inductor current IL changes toward a state of IL≥0 in switching mode A, and in switching modes B and C, the inductor current IL changes so as to increase further in a negative direction from a state of IL<0.

Because of this, an increase and decrease of the inductor current IL during the switching cycle T of the IGBT are repeated twice in a cycle of T/2. That is, when the duty ratio of the gate drive signal is equal to or greater than 50% too, alternating current of a frequency twice the switching frequency of the IGBT flows through the inductor L.

Herein, current flowing through a power semiconductor unit is such that current flowing through a diode element is greater than current flowing through an IGBT, and as diode elements become hottest among elements configuring a main conversion circuit, it is necessary to determine the need or otherwise for an overheat protection operation based on both the diode element temperature and IGBT temperature.

There is a correlation between the temperatures of the first diode element Di1 and second diode element Di2 and the temperatures of the third IGBT3 and fourth IGBT4 energized in the same operating mode, which also depends on energizing time and a correlated step-up ratio. Because of this, the temperatures of the third IGBT3 and fourth IGBT4 are calculated by the temperatures of the first diode element Di1 and second diode element Di2×(temperature ratio coefficient), using a temperature ratio coefficient that is variable in accordance with the step-up ratio.

As previously described, IGBT temperature is detected by the temperature sensor T, because of which the need or otherwise for overheat protection can be determined using a temperature signal of the temperature sensor T, and overheat protection can be carried out.

Next, a description will be given of FIGS. 14 and 15, which show examples of the relationship between the step-up ratio BR and temperature ratio coefficient.

FIG. 14 is a characteristic diagram wherein the horizontal axis represents the step-up ratio and the vertical axis represents the temperature ratio coefficient, and shows the temperature ratio coefficients of the fourth diode element Di4 and third diode element Di3 temperatures with respect to the first IGBT1 and second IGBT2 element temperatures at a time of a discharging operation with a step-up ratio of less than 2. Of characteristic lines in the diagram, a solid line indicates temperature ratio coefficient characteristics in a case wherein the magnitude of current passing between the primary side and secondary side of the DC-DC voltage conversion device is small, a dashed line indicates temperature ratio coefficient characteristics in a case wherein the magnitude of current passing between the primary side and secondary side of the DC-DC voltage conversion device is large, and a dotted line indicates temperature ratio coefficient characteristics between a case wherein the current magnitude is on the solid line and a case wherein the current magnitude is on the dashed line. In the diagram, the temperature ratio coefficient decreases as the step-up ratio BR increases from one to two. As shown in FIG. 13C, the step-up ratio BR increasing from one to two is linked to the switching duties of the first IGBT1 and second IGBT2 increasing from 0% to 50%, and although the current passing through the first IGBT1 and second IGBT2 is smaller than the current passing through the fourth diode element Di4 and third diode element Di3, the current passing through the first IGBT1 and second IGBT2 and current passing through the fourth diode element Di4 and third diode element Di3 become closer to the same magnitude together with the increase in switching duty. Note that the temperature ratio coefficient is also correlated to IGBT element heat dissipation thermal resistance and diode element heat dissipation thermal resistance, and although the magnitudes of current flow may be equal, the temperature ratio coefficient is not necessarily 1.

FIG. 14 shows a case wherein the step-up ratio BR is in the vicinity of approximately 1.4 and the temperature ratio coefficient is approximately 1, that is, the temperature of the fourth diode element Di4 is practically equivalent to the temperature of the first IGBT1, and the temperature of the third diode element Di3 is practically equivalent to the temperature of the second IGBT2. FIG. 14 shows that when the temperature ratio coefficient is less than 1, the temperature of the fourth diode element Di4 is lower than that of the first IGBT1, and the temperature of the third diode element Di3 is lower than that of the second IGBT2, but when wishing to change the threshold of determining the necessity or otherwise of overheat protection in accordance with the distribution state of the TS1 to TS4 and TDi1 to TDi4 temperatures, or the like, as previously described, diode element temperature in a case wherein the temperature ratio coefficient is less than 1 is also utilized.

When carrying out a discharging operation with a step-up ratio equal to or greater than 2, the magnitude of current passing through a diode is far smaller than the magnitude of current passing through an IGBT, as shown in FIGS. 21A, 21B, and 21C, because of which the operation no longer corresponds to an operating range in which diode overheat protection is necessary.

FIG. 15 is also a characteristic diagram wherein the horizontal axis represents the step-up ratio and the vertical axis represents the temperature ratio coefficient, and shows the temperature ratio coefficients of the second diode element Di2 and first diode element Di1 temperatures with respect to the third IGBT3 and fourth IGBT4 element temperatures at a time of a charging operation with a step-up ratio equal to or greater than 2. Of characteristic lines in the diagram, in the same way as in FIG. 14, a solid line indicates temperature ratio coefficient characteristics in a case wherein the magnitude of current passing between the primary side and secondary side of the DC-DC voltage conversion device is small, a dashed line indicates temperature ratio coefficient characteristics in a case wherein the magnitude of current passing between the primary side and secondary side of the DC-DC voltage conversion device is large, and a dotted line indicates temperature ratio coefficient characteristics between a case wherein the current magnitude is on the solid line and a case wherein the current magnitude is on the dashed line.

In the diagram, the temperature ratio coefficient decreases as the step-up ratio BR increases from 2 to 2.6. As shown in FIG. 23C, the step-up ratio BR further increasing from 2 is linked to the switching duties of the third IGBT3 and fourth IGBT4 increasing from 50% to 100%, and as the current passing through the third IGBT3 and fourth IGBT4 decreases while the current passing through the second diode element Di2 and first diode element Di1 increases, the temperature ratio coefficient exhibits decreasing characteristics. Note that the relationship between the IGBT switching duty and step-up ratio BR is not a linear relationship. Because of this, as shown in FIGS. 14 and 15, the characteristics do not have symmetry.

When the temperature ratio coefficient is less than 1, the temperature of the second diode element Di2 is lower than that of the third IGBT3, and the temperature of the first diode element Di1 is lower than that of the fourth IGBT4, but when wishing to change the threshold of determining the necessity or otherwise of overheat protection in accordance with the distribution state of the TS1 to TS4 and TDi1 to TDi4 temperatures, or the like, as previously described, diode element temperature in a case wherein the temperature ratio coefficient is less than 1 is also utilized.

Although not shown, characteristics when carrying out a charging operation of the DC-DC voltage conversion device with a step-up ratio of less than 2 and a temperature ratio coefficient equal to or greater than 1 are such that an operation of calculating the temperature ratio coefficient using a table reference is carried out in the same way as that previously described.

5. When Performing a Direct Connection

Next, a description will be given of a case of a direct connection operation, wherein the DC-DC voltage conversion device operates so that the primary side and secondary side voltages are the same, without carrying out switching.

In a case of direct contact and a discharging operation, only the third diode element Di3 and fourth diode element Di4 are continuously energized in the power semiconductor units. At this time, operation of the main conversion circuit 2 is the state of switching mode D of FIGS. 13A, 13B, and 13C.

Herein, the temperatures of the third diode element Di3 and fourth diode element Di4 depend on the flowing current, that is, on the inductor current IL, because of which estimated values of the third diode element Di3 and fourth diode element Di4 temperatures can be obtained by referring to a table having at least the inductor current as an input parameter, the necessity or otherwise of an overheat protection operation can be determined using the estimated values, and overheat protection can be carried out.

Figure 24:
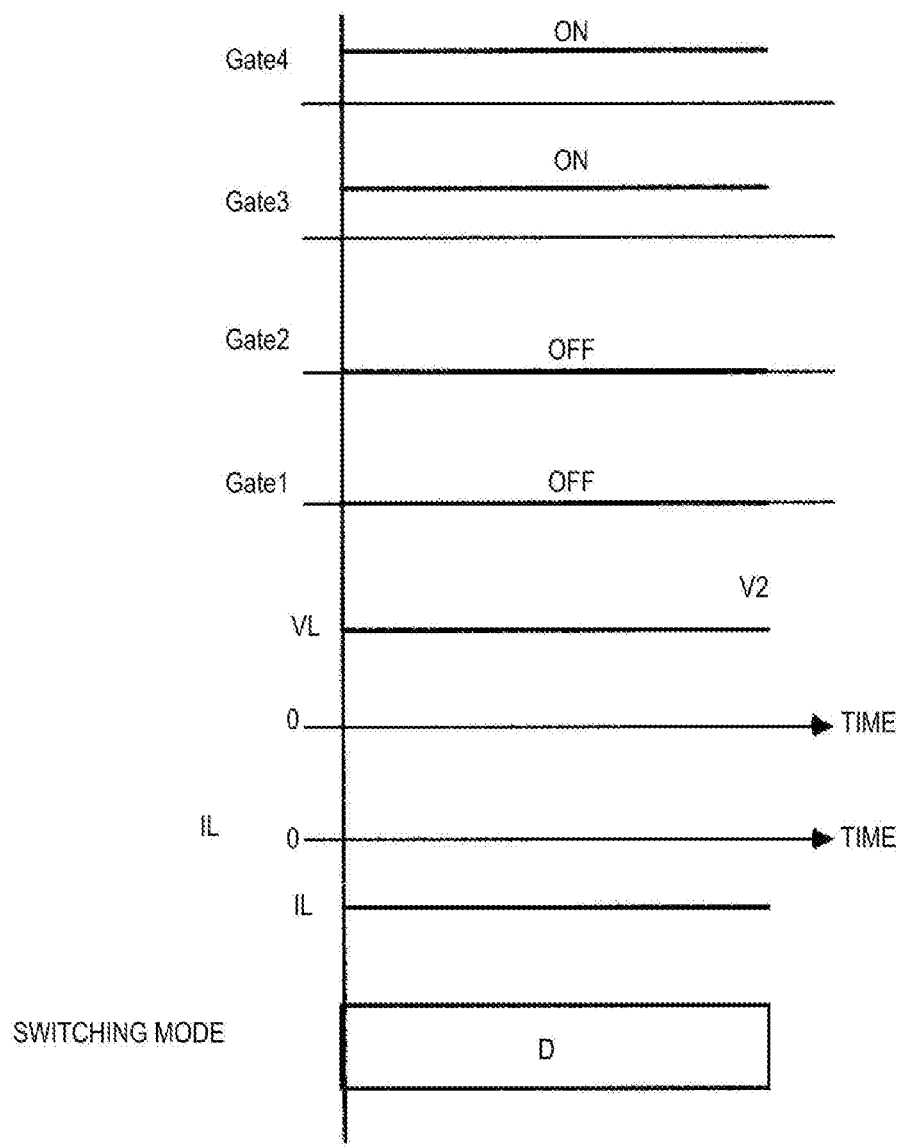
FIG. 24 is a waveform diagram of when the DC-DC voltage conversion device in the first embodiment of the invention is performing a direct connection.

Also, in a case of direct contact and a charging operation, only the third IGBT3 and fourth IGBT4 are continuously energized in the power semiconductor units. At this time, operation of the main conversion circuit 2 is the state of switching mode D of FIG. 12. As shown in FIG. 24, the gate drive signal first Gate1 and second Gate2 are turned off while the third Gate3 and fourth Gate4 are turned on, and the potential VL of the electrical connection point of the second IGBT2, third IGBT3, and inductor L is practically equivalent to the secondary side voltage V2 of the DC-DC voltage conversion device. Also, as a charging operation is being performed, the reference sign of the inductor current IL is negative.

As the third IGBT3 and fourth IGBT4 include the temperature sensor T, determination of the necessity or otherwise of overheat protection, and overheat protection calculation, are carried out using the IGBT element temperatures TS3 and TS4 detected using the temperature sensor T. Also, when the primary side voltage and secondary side voltage of the DC-DC voltage conversion device coincide, and the semiconductor switching elements have stopped switching, the diode element temperature calculation unit can calculate the diode element temperature based on a main conversion circuit coolant temperature correlated to the magnitude of current passing through the DC-DC voltage conversion device and the diode element temperature. The previously described overheat protection control can be carried out in accordance with the diode element temperature value obtained here.

In the heretofore described embodiment, a description has been given using an example wherein an IGBT is used as a semiconductor switching element, but when using a power device formed of a silicon carbide (SiC) material as a switching element, that is, when using an SiC element as a semiconductor switching element, switching loss is low and a band gap is wide, because of which the semiconductor switching element can also operate under a high temperature, meaning that a heat generation problem is a problem of heat generated in a diode element connected in parallel rather than in the semiconductor switching element. Because of this, a configuration wherein diode element temperature is calculated from a detected temperature using a correction calculation, and the calculated temperature is used for control, is more effective in protecting a DC-DC voltage conversion device.

According to the invention, as heretofore described, the necessity or otherwise of temperature protection can be appropriately determined, and protection from overheat destruction carried out, with a simple configuration, at low cost, and easily, by using a configuration and means such that diode element temperature of a main circuit that does not include a temperature detection unit is subjected to a correction calculation using a detected temperature of a power semiconductor element with correlation as a main circuit configuration of the DC-DC voltage conversion device and a step-up ratio, even when the diode element temperature is the highest among power semiconductor elements of the DC-DC voltage conversion device.

A description has been given of an embodiment relating to the invention, but this is only an example of a preferred working example of the invention, and can be arbitrarily combined with other embodiments.

That is, the diode element temperature calculation unit can calculate the temperature of the diode element using a temperature ratio coefficient that is variable in accordance with a step-up ratio, which is a ratio between the secondary side voltage and primary side voltage of the DC-DC voltage conversion device.

Also, characteristics of the temperature ratio coefficient of the diode element temperature calculation unit can differ between a time when the DC-DC voltage conversion device performs a discharging operation, whereby power is supplied from the primary side to the secondary side, and a time when the DC-DC voltage conversion device performs a charging operation, whereby power is supplied from the secondary side to the primary side.

Furthermore, the temperature ratio coefficient of the diode element temperature calculation unit may be a value fixed by referring to a table that has the step-up ratio and the magnitude of current flowing through the DC-DC voltage conversion device as input variables.

Various modifications and alterations of the invention will be apparent to those skilled in the art without departing from the scope and spirit of the invention, and it should be understood that this is not limited to the illustrative embodiment set forth herein.

What is claimed is:

1. A DC-DC voltage conversion device, comprising:
   a semiconductor switching element of a main conversion circuit;
   a diode element connected in parallel with the semiconductor switching element;
   a temperature detection unit that detects a temperature of the semiconductor switching element;
   a diode element temperature calculation unit that calculates a temperature of the diode element using a correction calculation that utilizes the semiconductor switching element temperature detected by the temperature detection unit and a step-up ratio of the DC-DC voltage conversion device; and
   overheat protection means that carries out control for protecting the diode element in accordance with a value of the calculated temperature.

2. The DC-DC voltage conversion device according to claim 1, wherein the diode element temperature calculation unit calculates the diode element temperature using a temperature ratio coefficient that is variable in accordance with a step-up ratio that is a ratio between a secondary side voltage and primary side voltage of the DC-DC voltage conversion device.

3. The DC-DC voltage conversion device according to claim 2, wherein characteristics of the temperature ratio coefficient of the diode element temperature calculation unit differ between a time when the DC-DC voltage conversion device performs a discharging operation, whereby power is supplied from the primary side to the secondary side, and a time when the DC-DC voltage conversion device performs a charging operation, whereby power is supplied from the secondary side to the primary side.

4. The DC-DC voltage conversion device according to claim 2, wherein the temperature ratio coefficient of the diode element temperature calculation unit is a value fixed by referring to a table that has the step-up ratio and a magnitude of current flowing through the DC-DC voltage conversion device as input variables.

5. The DC-DC voltage conversion device according to claim 1, wherein the diode element temperature calculation unit calculates the diode element temperature based on a coolant temperature of the main conversion circuit correlated to the magnitude of current passing through the DC-DC voltage conversion device and the diode element temperature when the primary side voltage and secondary side voltage of the DC-DC voltage conversion device coincide and the semiconductor switching elements have stopped switching.

6. The DC-DC voltage conversion device according to claim 1, wherein the main conversion circuit is such that a smoothing capacitor and an inductor are connected between a primary side positive electrode side terminal and negative electrode side terminal of the main conversion circuit, a serial body of four power semiconductor units wherein the semiconductor switching element and diode element are connected in anti-parallel is connected between a secondary side positive electrode side terminal and negative electrode side terminal, a terminal of the inductor differing from a connection terminal for a terminal of the smoothing capacitor is connected to a connection point of a second power semiconductor unit and third power semiconductor unit of the serial body of power semiconductor units, and an energy shifting capacitor is connected between a connection point of a first power semiconductor unit and the second power semiconductor unit and a connection point of the third power semiconductor unit and a fourth power semiconductor unit.

7. The DC-DC voltage conversion device according to claim 1, wherein the semiconductor switching element is an SiC element.

* * * * *